J. W. BELL.
CONCENTRATING PROCESS.
APPLICATION FILED OCT. 19, 1908.
987,689.
Patented Mar. 28, 1911.
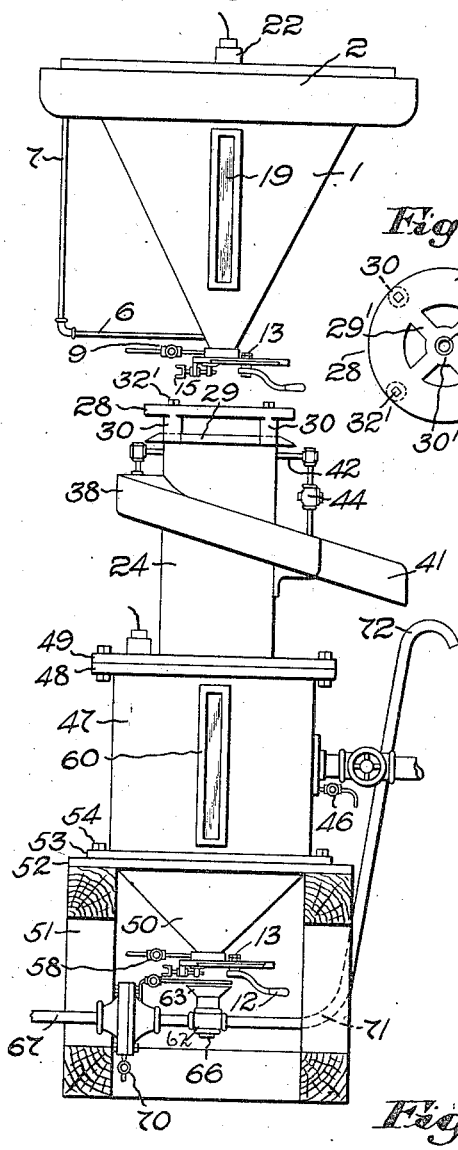
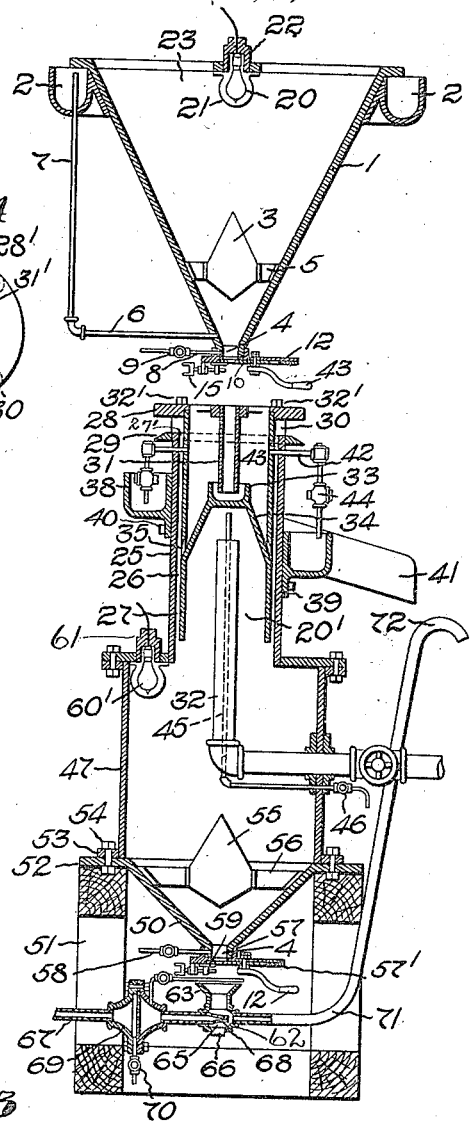
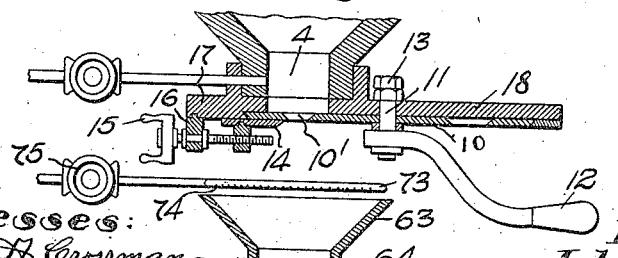
Witnesses:
Horace H. Crossman
Robert H. Kammler
Inventor:
John W. Bell
by Emery + Booth Attys

UNITED STATES PATENT OFFICE.

JOHN W. BELL, OF MONTREAL, QUEBEC, CANADA.

CONCENTRATING PROCESS.

987,689.  Specification of Letters Patent.  Patented Mar. 28, 1911.

Application filed October 19, 1908. Serial No. 458,363.

*To all whom it may concern:*

Be it known that I, JOHN W. BELL, a subject of the King of Great Britain, a resident of Montreal, in the Province of Quebec and Dominion of Canada, have invented an Improvement in Concentrating Processes, of which the following description, in connection with the accompanying drawings, is a specification, like letters on the drawings representing like parts.

My invention relates to a process for treating comminuted ore and other materials.

My invention may be best understood by the following description of my process as carried out in the apparatus described herein and illustrated in the accompanying drawing.

In the drawing,—Figure 1 is a front elevation of an apparatus illustrating my invention; Fig. 2 is a vertical section of the apparatus shown in Fig. 1; Fig. 3 is an enlarged detail showing devices pertaining to the delivery of material from the feeder and storage tank; and, Fig. 4 is a plan view of the classifier cover.

Referring to the drawing; For convenience of description the comminuted ore or material of any description to be treated will be hereinafter referred to as "sand". The sand is supplied with just enough water or other liquid to enable it to flow readily and uniformly through an orifice. Experiments have shown that the proper admixture of water can be secured by allowing the sand to settle in the water and to accumulate in a mass over the orifice, the sand particles settling into contact with each other, and the interstitial spaces therebetween being filled with water. It will be understood, of course, that the term "sand" distinguishes from the term "slimes" or from material having the fineness of impalpable powder, since slimes or powder when settled would pack closely and would tend to fill the interstitial spaces between the sand particles thereby preventing them from being filled with water as described. The mixture of sand and water, hereinafter referred to as "saturated sand" may be fed at a uniform rate to any suitable concentrating apparatus for classifying the sand by means of a cone-shaped hopper or feeder 1. Any excess water rising above the sand may flow over the upper rim of said feeder into a launder or trough 2, which encircles the cone-feeder 1 near its top, so that by the continuous over-flow of water the head of water over the orifice is maintained substantially constant and any sand carried along with this over-flow may be separately treated if found to contain slimes in suspension.

To draw the settled sands away from the sides of the interior of the cone-feeder 1 and prevent the same from forming a vortex or from being scooped out of the center thereof, the feeder may be provided with a small double cone 3, conveniently of sheet metal, arranged a short distance above a discharge orifice 4 and supported by radial bars 5 secured to the feeder wall.

To indicate the pressure of the water close to the orifice 4 a tube 6 communicates with the feeder just above said orifice, and has a glass tube 7 extending upwardly into the trough 2. In order to regulate the discharge from said feeder (Fig. 3) a water pipe 8, controlled by a valve 9, is led into the orifice 4. By a proper control of the water passing therethrough a small pressure of water at this point will diminish the discharge of the sand from the feeder, and is capable of reducing the output from full to no discharge, since by opening the valve 9 sufficiently the sand in the feeder is buoyed up by the water filling said orifice, and, if the pressure is great enough, water alone is discharged therethrough.

The continuous passage of sand and water through the orifice 4 will tend to wear it away. In order to provide new orifices and orifices of various size to insure uniform feed, a diaphragm or circular plate 10, having openings 10' of various sizes, may be mounted on a pivot pin 11 and rotated into positions of adjustment by a suitable crank 12 attached thereto. As fast as one orifice becomes worn a new opening or a different sized opening may be rotated around into registration with said orifice 4 and held in position by the tightening nut 13 on the pin 11.

As a further means of varying the size of the orifice and to correct wear thereon a slide 14, or its equivalent, may be mounted contiguous to the lower face of the plate 10 and may be moved to any desired extent across one of the openings therein by means of a hand screw 15, mounted in a bracket 16 depending from a flanged plate 17 which embraces the end of the feeder 1 and may be extended laterally to form a further support 18 for said plate 10.

To enable a mill attendant to watch the material coming into the feeder 1 and observe the height therein, the feeder 1 may be made entirely or partly of some transparent material, such as glass. In the present illustration there is shown a narrow vertical window 19, extending approximately the entire length of said feeder.

Under some circumstances it is inconvenient for the mill operative to climb up to inspect said window and, in order to enable a ready observation of the level formed by the top of the material resting against the glass, and to observe the progress of the material in the feeder 1, an electric lamp 20 or other equivalent device may be introduced into the interior of the tank and attached at any convenient place and protected by a suitable transparent globe 21 if desired. Said lamp may be mounted in an iron plug 22 having a recess 23 for the lamp socket, said recess being preferably filled with marine glue and the lamp and socket made water tight by insulating tape.

Means for observing the level of material in said feeder enables the attendant to see and make sure that the level of the settled sands is maintained sufficiently above the feeder orifice to prevent a free flow of water therethrough.

The material to be classified is discharged into the feeder in varying amounts and is allowed to settle in water. By preventing free flow of water through the discharging orifice by keeping the level of the saturated sand above said orifice the saturated sand will be discharged at a uniform rate per minute, the rate depending on the size of the orifice and the size of the material passing therethrough. The level of the sand in the feeder rises if the sand is fed in faster than it is discharged, and falls when it is fed in slower than it is discharged. The discharge, however, is uniform and the feeder thus acts as a compensator for the irregularities in the feed to the feeder, since the rise and fall of the sand level has no effect on the discharge, as long as free flow of water through the discharge orifice is prevented.

The best classification depends on feeding a large amount of sand mixed with a small amount of water, and this is effected by means of the feeder described above. It may be supposed that the feeder is filled with dry sand. Sand will pour out of the orifice 4 at an absolutely uniform rate, irrespective of the depth of sand in the feeder. Sand saturated with water also flows out at a uniform rate, but with this difference, that the frictional resistance between the sand particles is diminished by virtue of the water which occupies the spaces between the sand particles and, consequently, the sand flows more freely and the rate is increased. The proportion of sand and water discharged depends upon the size and specific gravity of the ore material, but roughly the discharge from this feeder consists of about one-third water and two-thirds sand. The rate of water discharged through said orifice is much less than the rate of water that would be discharged through the orifice if the feeder 1 were filled with water and the pressure were dependent on the hydrostatic head above the orifice, as the sand offers a large amount of frictional resistance to the passage of the water through the spaces between the sand particles and the flow of the sand through the orifice also retards the exit of the water. The small amount of water discharged is, of course, under a small amount of pressure and helps drive the sand slightly, but the great uniformity of the discharge indicates that we have here a combination of two pressures—the pressure of the sand obeying the same law as obtains in the dry sand feeder, and the slight water pressure or head possible considering the enormous frictional resistance offered by the sand particles to the flow of the water therethrough.

It will be noted that the pressure on the bottom of the feeder is small compared to the pressure or weight carried by the sides thereof, and this explains the absolute uniformity of the feed.

For assorting the sand coming from said feeder 1, any suitable classifier may be employed, preferably placed directly beneath said feeder.

In the present embodiment of my invention I employ a hydraulic classifier, herein a cylindrical tank 24 comprising concentric walls 25, 26 spaced apart to form a narrow, annular chamber or classifying space 27. The inner wall 26 may extend upwardly beyond the outer wall 25 and be attached to the cover 28. Said cover herein comprises an annular ring 28' having cross pieces 29' forming a central hub 30' having an opening 31', and may be supported on a collar 29 screwed or otherwise attached to the upper end of said wall 25. The cover 28 does not rest immediately upon said collar but is separated therefrom by lugs 30 and may be fastened to said collar by suitable bolts 32'. This elevation of the cover above the classifier forms an outlet for the annular chamber 27.

The saturated sand from the feeder may be introduced into the classifier through said cover 28 and a downwardly extending tube 31 attached to the opening 31' therein. A water pipe 32 for creating an upward flow of water in the classifier extends upwardly in the center thereof to a point a short distance below said tube 31. The sand from the tube 31 does not strike the water directly as the latter issues from said pipe 32, but its flow is interrupted and its direction temporarily changed by a circular cup 33 located below said tube 31. Said cup may be mounted on a cone 34 which forms a further interruption between the downward flow of sand and the upward flow of water. Said cone 34 extends downwardly and joins or may be integral with the lower part of the inner wall 26, the latter having an interrupted annular opening 35 cut just above this juncture, leaving a small amount of metal sufficient to support said parts.

The sand passes over the edge of the cup 33 downwardly and is diverted to the opening 35 by the cone 34 and passes into the annular chamber 27, where it meets the upward flow of water which has passed from the pipe 32 under the cone 34 down by the inner side of the wall 26 around its end up into the chamber 27. The water passing through this eddy chamber 20' in an indirect path is freed from eddies which disappear as the water turns to rise in the classifying space 27, and when it reaches the sand is of uniform pressure and velocity throughout. The heavier or larger sand particles called spigot product, will gravitate downwardly through the annular chamber 27, while smaller or lighter portions of the ore particles, called overflow product, follow with the current of the water upwardly into the annular space 27, flowing over the edge of the classifier wall 25 through the outlet and between the top of the classifier and said cover 28 and pass through a launder 38 encircling said classifier. Said launder may be secured to the exterior of the classifier in any convenient manner, as by flanges 39 fastened thereto by suitable bolts 40 and may be arranged at an angle inclined to deliver the material fed therein through a lateral trough 41.

As heretofore described, by means of the feeder 1 a much larger amount of sand than water may be fed to the classifier. However, if the comparatively small amount of water coming into the classifier were to pass down with the sand through the opening 35 into the annular space 27, the latter containing the rising current of water which effects the classification, it would be apparent that the additional amount of water would increase the velocity of the water in the upper annular spaces 27', since the latter would have to take care of the water coming in with the sand in addition to the rising current. To avoid this increase in velocity, a sufficient number of pipes 42 may be introduced radially into the central annular space 43 surrounding the tube 31, and be provided with cocks 44, which may be adjusted to carry off the amount of water coming in with the sand. This provision for carrying off the additional water maintains the velocity of the rising current in the annular space 27, 27' constant in all parts thereof.

Nothing but the very finest particles of ore material would be likely to be drawn off through these pipes 42, said pipes discharging into the trough 38, which carries off the overflow from the classifier. The saturated sand is discharged so far below the suction of pipes 42, that all of said sand will pass into the classifying space 27, but if any fine particles should rise to the height of the pipes 42, they will be discharged and mixed with their proper class, namely, the overflow product.

Any air which may be present in the eddy chamber 20' or which may be introduced by the current of water passing through the pipe 32, on starting the classifier and from time to time thereafter, may be drawn off by a small pipe 45 which may be led into said classifier to extend nearly to the under side of the cup 33, and may be controlled by a suitable valve 46.

The mineral or a spigot product which succeeds in gravitating through the upward flow of water may be received and delivered by a combined accumulating and discharge tank 47, or spigot product feeder, herein of cylindrical shape and of greater diameter than said classifier, and attached thereto by a flange 48 bolted to a ring 49 on the lower end of the wall 25 of said classifier. The accumulation tank thus forms an enlarged end or continuation of the classifier, the heavier sand particles dropping directly therein from the annular chamber 27 and accumulating or piling up therein at a rate dependent on the rate of delivery of material thereto and therefrom.

To control the delivery from the accumulating and discharge tank 47, a cone hopper 50 may be attached to the lower end of said tank. This hopper herein is mounted in any suitable frame 51, and may be provided at its upper end with outwardly extending flanges 52, which may be securely fastened to the flanges 53 on the lower end of the tank 47, by means of bolts 54. This cone hopper 50 controls the delivery of the accumulated product and is substantially similar in construction to the feeder cone 1. More specifically, said cone hopper is preferably provided with a double cone 55, which may be attached to the interior of the hopper 50 by suitable radial supporting members 56. To control the output through the orifice 57, there may be provided a pipe 58, an orifice diaphragm 57' and a manually controlled slide 59, similar to the corresponding devices in the cone-feeder 1 (Fig. 3).

To enable a ready observation of the level of the material and to see that the settled material is maintained at a level sufficiently above the orifice to prevent free flow of water through the discharge orifice in the spigot product feeder, as said material accumulates in the tank 50, the latter may be constructed of transparent material, such as glass, or as herein shown, said tank may be provided with a vertical window 60 extending approximately the entire length thereof. Ready observation of the conditions within said tank 36 may be facilitated by an electric lamp 60', or other equivalent device, introduced therein. Herein said lamp is supported by an iron plug 61 introduced into the lower ring 49 of the classifier. This electric lamp in its detail is substantially similar to the lamp 20 hereinbefore described.

The comminuted ore or sand is fed by the feeder at a uniform rate, consequently the observed relative rate of rise and fall of the level of material in the feeder and accumulating tank respectively indicates the proportion of heavier particles in the ore material. The accumulation tank thus acts as a gage of the rate of formation of the spigot product. Said tank also operates to deliver the accumulated product at a uniform rate, since the cone-hopper is constructed similar to the cone-feeder.

The means for observing the accumulation of spigot product in the spigot product feeder, permits the attendant to keep the level of the product therein sufficiently high to prevent the free flow of water therethrough as in the cone-feeder described above.

There must not be a free flow of water through the spigot product feeder, since it would suddenly diminish the water rising in the classifying space and this reduction in the upward flow of water would allow material to fall through, which should pass off in the overflow.

As long as the level of the spigot product is sufficiently above the tank orifice, the spigot product discharge will be uniform and there will be no interference with a uniform upward flow of water in the classifying space.

As the material is discharged from the tank 50 it is desirable to raise it to a higher level, and to effect this a hydraulic lift 62 may be provided. Preferably this lift is located directly below the orifice 57, in order to receive material therefrom, and in the present embodiment comprises a flaring hopper 63, having a neck 64 (Fig. 3). A four-way combining chamber or fitting 65 may be fastened at one end to said neck 64, and, at its opposite end is preferably provided with a plug 66, the latter permitting access to the interior of said chamber for purposes of cleaning. The water for effecting the lift may be introduced into the union 65 by means of a pipe 67, terminating in a nozzle 68, the latter being held in place in one of the side openings of said combining chamber and extends into and occupies a central position therein.

In order to prevent any impurities being fed into the hydraulic lift to mix with the accumulated product or choke the nozzle, any suitable strainer 69 may be interposed in said pipe 67. Any accumulation in said strainer may be flushed out through the valve 70. The water for creating the lifting effect passes through the pipe 67, the strainer 69, through the nozzle 68, and into the uniting chamber 65, and forces the material fed therein through the pipe 71 introduced into the opposite opening of the union 65, upwardly through said pipe 71 and discharges through the goose-neck 72.

To facilitate the flow of the accumulated product through the hopper 63 a water pipe or sprinkler 73 may be provided, shaped to conform to the upper, inner, peripheral surface of said hopper 63, and perforated on its under side as at 74. The passage of the water through said pipe 73 may be controlled by any suitable valve 75.

Previous forms of classifiers receive the sand to be classified mixed with and carried to the classifier in about ten volumes of water to one of sand, that is, about six or seven times as much water by weight as sand in the feed, whereas by the feeder shown herein the amount of water is reduced to about one-half in amount by weight of the weight of the sand.

In classifiers where the excess of water in the feed flows off at the top, some form of chamber or receptacle of comparatively still water is necessary to enable the sand particles to settle and meet the upward flow of current. This inevitably causes the accumulation of a material which can neither sink through the upward current nor escape from the receptacle, said accumulation interfering greatly with the presentation of following grains to the upward current; or, if this accumulation is prevented by making all of the water move with sufficient velocity to carry them off after being ejected by the rising current, then a sluicing action is brought into play, which again is bound to result in poor classification.

Other forms of classifiers pass the water coming in with the feed, into the rising current, causing variations in velocity which result in poor classification.

It will be observed that the apparatus shown herein avoids these troubles, the feeder described herein feeding the comminuted ore at a constant rate and the small amount of water coming into the classifier with the feed being independently carried off through the pipes 42, thus permitting a constant velocity in the upward current of water and a resulting uniform classification of the ore particles.

It will also be observed that the feed from the cone-feeder to the present, or any other, classifier is uniform. The constant upward flow of water in the classifier herein effects a separation of the comminuted ore material into heavier and lighter classes uniformly.

It will also be understood that my invention is not limited to the particular embodiment shown herein, but that various modifications may be made without departing from the spirit of my invention.

Claims.

1. A process of treating ore material characterized by comminuting ore to form sand, settling said sand in water and removing slimes therefrom to form saturated sand, accumulating a mass of said saturated sand and continuously discharging the same from said mass while maintaining the latter of sufficient bulk to prevent gravitation of free water therethrough and under a substantially constant head of water whereby to obtain a substantially constant rate of delivery.

2. A process of treating ore material characterized by comminuting ore and separating fine material therefrom to leave sand, accumulating a mass of said sand and continuously discharging the same from said mass while maintaining the latter of sufficient bulk above said discharge point to obtain constantly a substantial head whereby to obtain a substantially constant rate of delivery.

3. A process of treating ore material characterized by comminuting ore to form sand, settling said sand in water and removing slimes therefrom to form saturated sand, accumulating a mass of said saturated sand and continuously discharging the same from said mass while maintaining the latter of sufficient bulk to prevent gravitation of free water therethrough and under a substantially constant head of water whereby to obtain a substantially constant rate of delivery and then introducing this constant flow of sand into a flow of water to permit the heavier ore particles to settle by their gravitation through said water and cause the lighter ore particles to be carried away with said flow.

4. A process of treating ore material characterized by comminuting ore to form sand, settling said sand in water to form saturated sand, accumulating a mass of said saturated sand and discharging the same from said mass while maintaining the latter of sufficient bulk to prevent gravitation of free water therethrough and under a substantially constant head of water whereby to obtain a substantially constant rate of delivery; then introducing this constant flow of sand into a uniform upward flow of water to separate out the heavier ore particles by their gravitation through said water and cause the lighter ore particles to be carried away with said flow, settling said heavier particles through said flow, accumulating the same in a mass beneath said upward flow and discharging the particles from said mass while maintaining the latter of sufficient bulk to prevent gravitation of free water therethrough and under a substantially constant head of water, whereby to obtain a substantially constant rate of delivery of said heavier particles and to contribute to the maintenance of the uniformity of the current of water.

5. A process of treating ore characterized by comminuting the ore, feeding the same into a uniformly rising current of water to separate said ore into spigot and overflow product, accumulating said spigot product in the form of a mass of saturated sand beneath said water and discharging the sand from said mass while maintaining the latter of sufficient bulk to prevent gravitation of free water therethrough whereby to obtain a substantially constant rate of delivery of the spigot product and prevent disturbance of the uniformity of the rising current above said accumulated product.

6. A process of treating ore characterized by comminuting the ore, feeding the same into a uniformly rising current of water to separate said ore into spigot and overflow product, accumulating said spigot product in the form of a mass of saturated sand beneath said water and discharging sand from said mass while maintaining the latter of sufficient bulk to prevent gravitation of free water therethrough and under a substantially constant head of water whereby to obtain a substantially constant rate of delivery of the spigot product and a substantially uniform rising current.

7. A process of treating ore characterized by comminuting the ore to form sand, settling said sand in water to form saturated sand, accumulating a mass of said saturated sand and discharging the same from said mass while maintaining the latter of sufficient bulk to prevent gravitation of free water therethrough and under a substantially constant head of water whereby to obtain a substantially constant rate of delivery; then removing the water contained in the saturated sand while delivering the sand into a rising current of water to assort the sand into spigot and overflow product, settling said spigot product through said current, accumulating the same in a mass beneath said current and discharging the spigot product from said mass while maintaining the latter of sufficient bulk to prevent gravitation of free water therethrough and under a substantially constant head of water whereby to obtain a substantially constant rate of delivery of said heavier particles and to contribute to the maintenance of the uniformity of the upward flow of water.

In testimony whereof, I have signed my name to this specification, in the presence of two subscribing witnesses.

JOHN W. BELL.

Witnesses:
 C. MAUDE ROSS,
 JOSHUA A. BELL.